(12) United States Patent
de Gaillard

(10) Patent No.: US 6,517,135 B2
(45) Date of Patent: Feb. 11, 2003

(54) MOTOR VEHICLE WITH A CONVERTIBLE PASSENGER COMPARTMENT

(75) Inventor: Francois de Gaillard, Mouilleron en pareds (FR)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/880,105

(22) Filed: Jun. 14, 2001

(65) Prior Publication Data

US 2002/0008396 A1 Jan. 24, 2002

(30) Foreign Application Priority Data

Jun. 15, 2000 (DE) .......................... 100 28 781

(51) Int. Cl.$^7$ ................................. B60P 3/34
(52) U.S. Cl. ................. 296/26.09; 296/99.1; 296/26.08
(58) Field of Search .......................... 296/26.09, 26.08, 296/26.01, 194, 197, 99.1, 220.01

(56) References Cited

U.S. PATENT DOCUMENTS

| | | | | |
|---|---|---|---|---|
| 1,924,030 A | * | 8/1933 | Elser | 296/99.1 |
| 2,816,794 A | * | 12/1957 | Temp | 296/26.08 |
| 3,298,731 A | * | 1/1967 | Sangimino | 296/99.1 |
| 3,419,304 A | * | 12/1968 | Sangimino | 296/99.1 |
| 3,820,839 A | * | 6/1974 | Molatalab | 296/99.1 |
| 3,888,539 A | * | 6/1975 | Niessner | 296/26.09 |
| 4,133,571 A | * | 1/1979 | Fillios | 296/26.09 |
| 4,842,326 A | * | 6/1989 | DiVito | 296/197 |
| 4,886,411 A | * | 12/1989 | Pieperhoff et al. | 296/26.09 |
| 5,087,091 A | * | 2/1992 | Madill | 296/99.1 |
| 5,628,541 A | * | 5/1997 | Gardner | 296/26.09 |
| 5,864,991 A | * | 2/1999 | Burns | 296/26.09 |
| 6,213,531 B1 | * | 4/2001 | Corey et al. | 296/26.09 |

FOREIGN PATENT DOCUMENTS

| | | | |
|---|---|---|---|
| DE | 26 47 236 | | 4/1978 |
| DE | 35 31 394 A1 | | 3/1987 |
| DE | 36 06 759 A1 | | 9/1987 |
| DE | 3613772 A1 | * | 10/1987 |
| DE | 3837252 A1 | * | 5/1990 |
| DE | 38 37 252 A1 | | 5/1990 |
| DE | 42 20 438 A1 | * | 12/1993 |
| DE | 195 48 997 C1 | | 2/1997 |
| FR | 2587659 A1 | * | 9/1985 |
| GB | 2218384 A | * | 11/1988 |
| GB | 2244959 A | * | 6/1990 |

* cited by examiner

*Primary Examiner*—Kiran Patel
(74) *Attorney, Agent, or Firm*—Nixon Peabody LLP; David S. Safran

(57) ABSTRACT

A motor vehicle with a convertible passenger compartment (2) is formed from a fixed front section (3) which has the motor vehicle roof (5) and a rear movable sliding module (4) which is movably supported on the body and can be moved to vary the size of the passenger compartment (2) relative to the fixed front section (3) between a short position and a long position.

23 Claims, 4 Drawing Sheets

MOTOR VEHICLE WITH A CONVERTIBLE PASSENGER COMPARTMENT

BACKGROUND OF THE INVENTION

1. Field of the Invention

The invention relates to a motor vehicle with a convertible passenger compartment.

2. Description of Related Art

Published German Patent Application DE 26 47 236 A1 discloses a motor vehicle which has a front window frame and a rigid section of the top part of the body, which section can be moved to the rear in the lengthwise direction of the motor vehicle, and which is guided within a fixed side wall of the lower part of the body. This movable rigid roof part allows open driving in the motor vehicle, especially a passenger car, without the roof part having to be removed from the motor vehicle.

Published German Patent Application DE 36 06 759 A1 discloses a retrofittable motor vehicle, such as a pickup truck, which has a passenger compartment which is roofed in the area of a front row of seats, and has an open rear area to which different body units can be attached, such as, for example, a pivotable roof element with pivotable side windows.

SUMMARY OF THE INVENTION

A primary object of the present invention is to devise a motor vehicle of the initially mentioned type with functionality and utility which can be improved by simple retrofitting of the passenger compartment.

This object is achieved in accordance with the present invention in a generic motor vehicle by the passenger compartment being formed from a fixed front section which has the motor vehicle roof and a rear movable sliding module which is supported to move on the body relative to the fixed front section to vary the size of the passenger compartment between a short position and a long position. To adjust the desired size of the passenger compartment, thus, only the sliding module which is supported on the body is slid in the lengthwise direction of the motor vehicle. In doing so, the front body-mounted section of the passenger compartment including the motor vehicle roof is preserved unchanged, while the sliding module, which is formed box-like with a modular roof and with side parts and a back section, is moved relative to the body-mounted section.

The passenger compartment represents a vehicle structure which surrounds the motor vehicle interior, and for example, comprises the seat area for the passengers and the cargo or trunk area in a station wagon. This motor vehicle structure contains a fixed front section and a sliding module. The fixed front section comprises, for example, a driver's compartment with the driver's seat and the passenger seat, such as, for example, in a pick-up truck or a truckster with a cargo area or a motor vehicle interior of a two-door or four-door passenger car with one or two rows of seats.

Preferably, the sliding module can be pushed into the fixed front section so that the modular roof and the side parts are located within the fixed section. The modular roof is for example pushed to under the motor vehicle roof and is covered by a head liner towards the motor vehicle interior. The motor vehicle roof can also be a two-layer construction, the modular roof being pushed between the two layers.

The side parts of the sliding module can be fixed walls which are pushed in front of or behind the respective outside wall of the motor vehicle. However, if the sliding module is to be pushed largely into the passenger compartment, so that the fixed side walls of the sliding module would cover the side windows of the motor vehicle or especially the side doors, it is feasible for the sliding module to have, on each side, a side wall part or a side window which can be removed and re-inserted in the long position of the sliding module. When the side wall part or the side window is removed from the sliding module and the sliding module thus has open sides and especially has no front frame which extends laterally downward, the side window or the side door of the motor vehicle is not covered by the sliding module in its pushed-in short position. The rear lateral vertical frame of the sliding module remains in the short position for example in the area of a C-column of the motor vehicle and thus prevents use of the side doors or side windows of the motor vehicle.

For purposes of simple and automated, especially motorized, operation in the conversion of the passenger compartment, it is preferred that, for each side window, there is a side holding space which is provided on a side wall of the motor vehicle or on a side wall of the cargo space of the body and into which the side window can be moved down in the long position of the sliding module. In doing so, on the side holding space, there can be guides for the side window, on which the side window is supported to be able to move vertically. In the extended long position of the sliding module, a position assignment is set between the guides for the side window and the window, and a bearing or a frame on the sliding module for the side window such that the side window can be pushed between its closed position on the sliding module and its open position which is lowered in the holding space and in which it remains when the sliding module is being pushed.

In one alternative embodiment, the side windows or the side parts can be manually removed from the sliding module and then re-inserted. The manual removal and re-insertion make complex guide and actuating means unnecessary.

The sliding module which forms the rear termination of the motor vehicle interior can contain a rear window as its own rear termination. When the sliding module is displaced, the rear window can remain on the back of the sliding module or it can be removed from the sliding module in one preferred embodiment, and it can likewise be manually removed or can be lowered by a guide means into a rear component, for example, a rear hatch.

For manually removable windows, it is feasible to provide at least one storage space for the removed side windows or the rear window on the motor vehicle. One such storage space is located, for example, behind the vehicle seats, especially the back seats, and is especially a holding compartment. This holding compartment is preferably arranged essentially vertically and can be folded especially onto the bottom of the cargo space or trunk. Thus, with the back seats folded down, the entire cargo space can be used without interruption.

Preferably, the sliding module has two rear supports in the manner of C-columns or D-columns. The supports can be called D-columns when the sliding module is located in its extended long position on the motor vehicle rear and the supports assume the position of the D-columns of a motor vehicle such as a station wagon. The supports of the sliding module assume a C-column position, for example, in a pick-up truck with a short driver's compartment with one row of seats. Via the supports, the sliding module is movably supported on its rear area on the body, and it can be movably supported on side lengthwise guides via the supports. One such side lengthwise guide is, for example, located in a rear motor vehicle side wall or on the top edge of a side wall which ends at the height of the equator line. Alternatively, the sliding module can be movably supported on lengthwise guides on the side wall of the bed and/or on the cargo surface.

The sliding module can be movably supported in the area of its modular roof on the fixed motor vehicle roof for stable guidance.

For versatility of the motor vehicle, the sliding module can contain a seating means which can be moved with the sliding module, the seating means having especially a seat surface which can be folded up. If the seating means can be removed from the sliding module, with a corresponding configuration, the sliding module can be pushed largely into the fixed front section of the passenger compartment.

Depending on the version of the motor vehicle, the fixed front section of the passenger compartment can have one row of seats or two rows of seats located in succession.

The motor vehicle can be configured such that the sliding module forms a rear motor vehicle body in the manner of a station wagon in its extended long position. On the other hand, the motor vehicle can be a pick-up truck with an open rear bed, the sliding module in its extended long position being located over the front section of the bed.

Embodiments of the motor vehicle are explained in greater detail below with reference to the accompanying drawings.

DETAILED DESCRIPTION OF THE PREFERRED EMBODIMENTS

Figure 1:
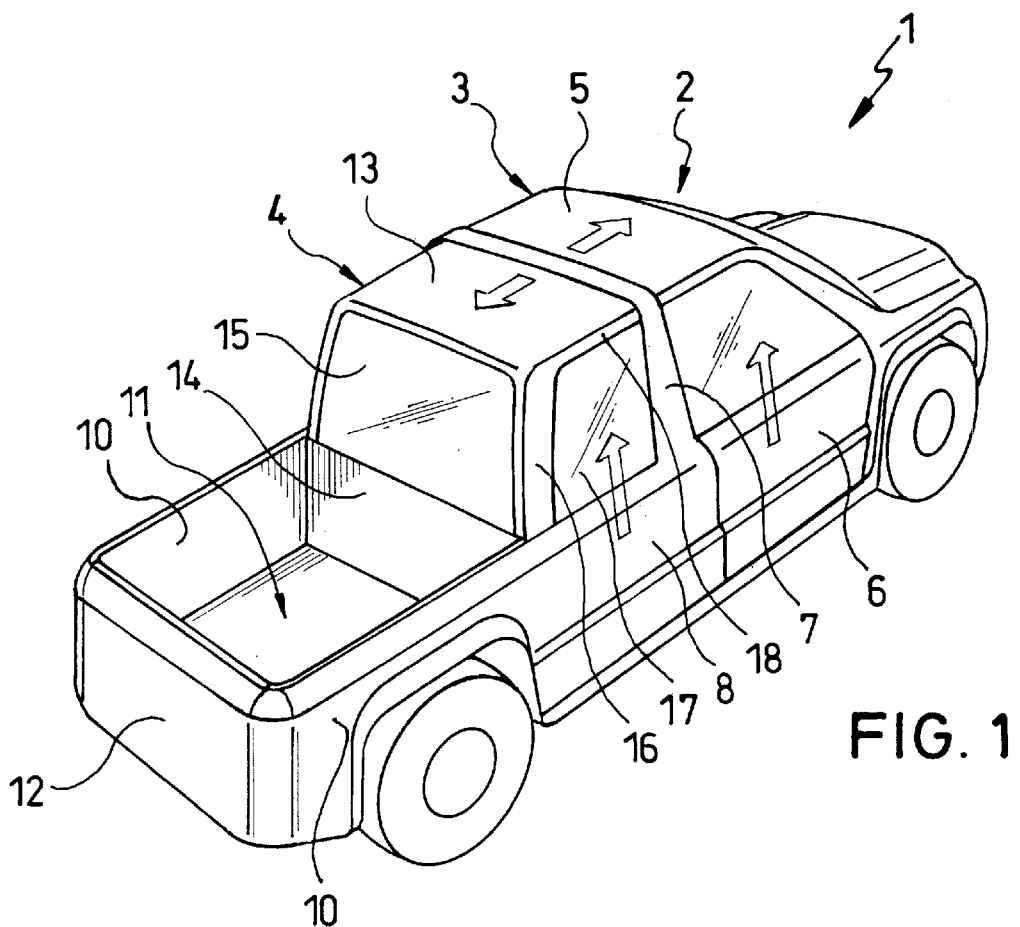
FIG. 1 is a perspective rear view of a first embodiment of a motor vehicle in accordance with the invention with a convertible passenger compartment.

A light truck 1 with a bed, which is also called a pick-up truck (see FIG. 1), contains a passenger compartment 2 of variable size which is formed by a body-mounted fixed front section 3 and a rear sliding module 4. The fixed front section 3 contains a fixed motor vehicle roof 5, driver and passenger doors 6 and a fixed frame part 7 which is located in the area of the B-column adjoining the doors 6 and is formed, in the manner of a roll bar, as a rigid body part which runs upwards from the vehicle side walls 8 and transversely over the motor vehicle roof 5 and forms a rear termination of the fixed motor vehicle roof 5. In the fixed front section 3 of the passenger compartment 2, there is one row of seats 9 for the driver and passenger.

The open bed 11, which is bordered by the its side walls 10, extends roughly from the fixed frame part 7 to the tailgate 12.

The sliding module 4, which forms a movable rear section of the passenger compartment 2, contains a modular roof 13, a rear wall 14 with a rear window 15, side rear columns 16, which are also called C-columns here, and side windows 17 which are bordered at the top by the lateral lengthwise roof frame 18 and to the rear by the C-columns 16. The sliding module 4 has an outline, in cross section, of a shape such that the rear wall 14 is fitted to be able to move lengthwise between the two side walls 10 of the bed, and the module roof 13 with the two C-columns 16 and the lengthwise roof frame 18 can be pushed into the fixed front section 3 of the driver's compartment 2, the modular roof 13 being pushed into or under the front motor vehicle roof 5, for example, between the motor vehicle roof 5 and the headliner of the driver's compartment 2.

Figure 2:
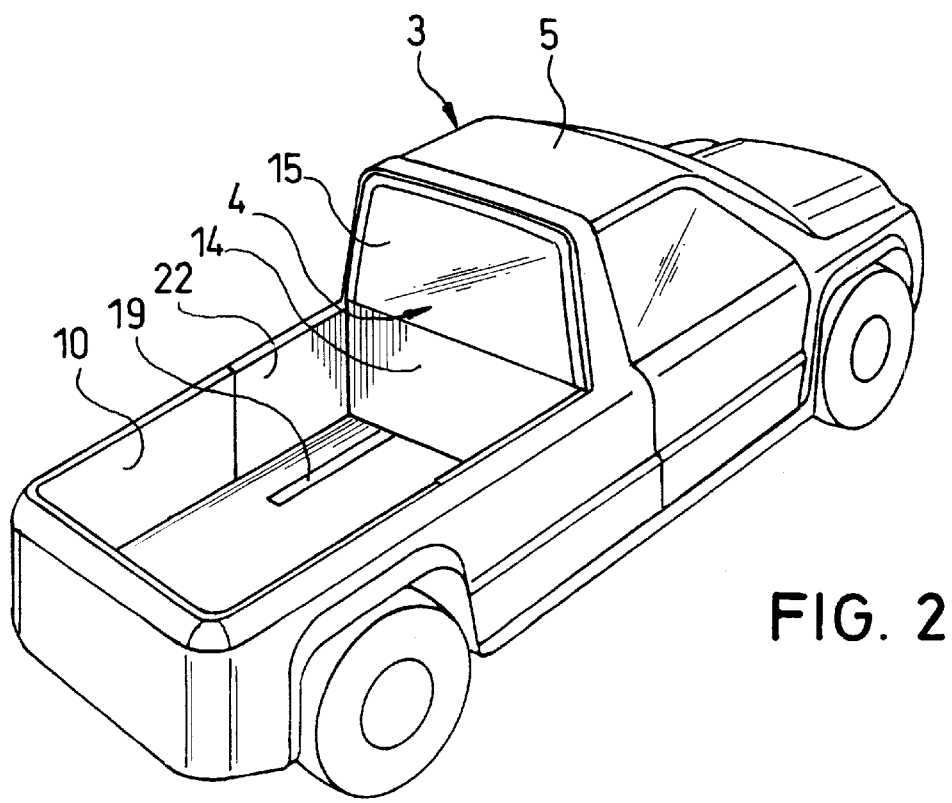
FIG. 2 is a perspective rear view of the FIG. 1 motor vehicle in the short position of the passenger compartment.

The sliding module 4 is movably supported on guides 19 (see FIG. 2) which are located, for example, in the bottom of the bed 11 and on the roll bar formed by the fixed frame part 7.

Figure 3:
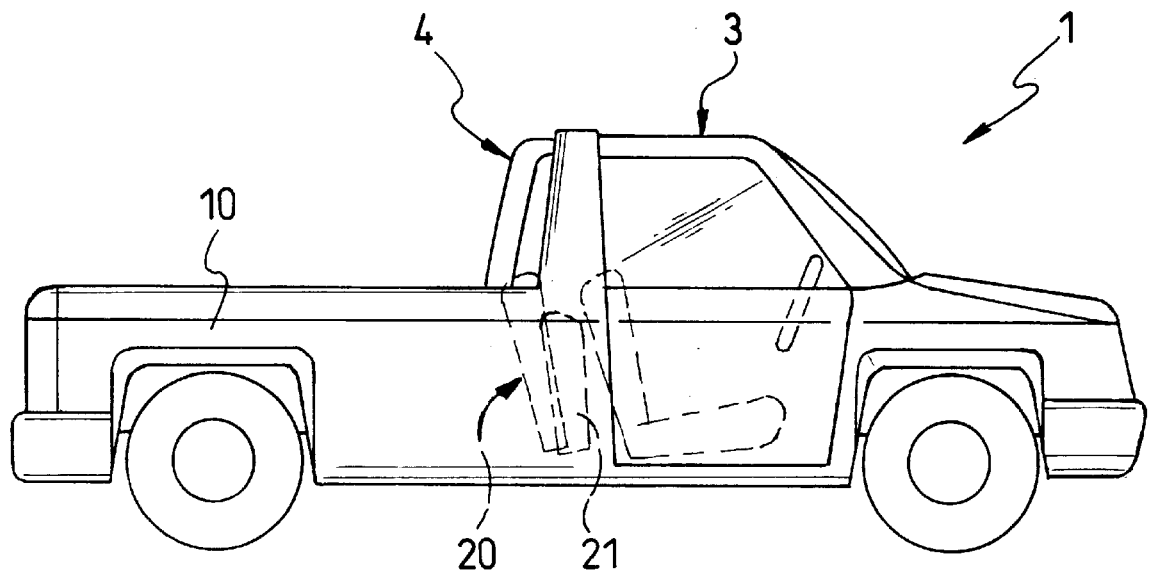
FIG. 3 is a side view of the motor vehicle in the short position of the passenger compartment.
Figure 4:
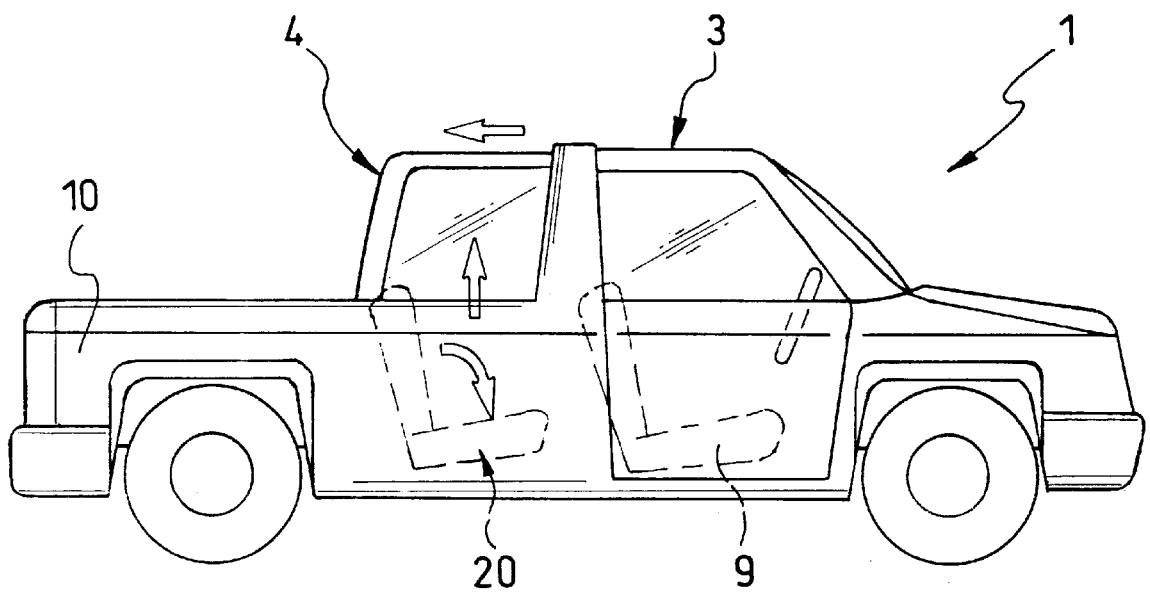
FIG. 4 is a side view the motor vehicle in the long position of the passenger compartment.

The side windows 17 of the sliding module 4 are movably supported in the position in which they are not being used, i.e., when the sliding module 4 is inserted into the fixed section 3 (FIG. 2 & 3), on guides in the side walls 10 of the bed and are located in a holding compartment 22. The side windows 17 can be raised out of the compartment 22 into the sliding module 4 when it is in its rear extended position (FIG. 1 & 4). The front section of the side windows 17 then tightly adjoin the fixed section 3 of the driver's compartment 2, especially the roll bar 7.

In the front position of the sliding module 4, which with respect to the variable length of the driver's compartment 2 is called the short position (see FIG. 2 & 3), module 4 is pushed into the fixed section 3, the roll bar 7, for example, adjoining the module roof 13 and the C-columns 16 by means of a seal, and the lower section of the rear wall 14 tightly laterally adjoining the side walls 10 of the bed. The side windows 17 are lowered into the side walls 10 of the bed space and are held in the holding compartments 22. In the short position shown in FIGS. 2 and 3, in the driver's compartment 2, within the sliding module 4, there is a rear bench seat 20 with a seat surface 21 which is folded up to save space.

To expand the driver's compartment or the passenger compartment 2, the sliding module 4 is pushed to the rear (see FIG. 1 & 4), moving to the rear over the bottom of the bed 11. In the extended long position, the sliding module 4 is locked against moving and the side windows 17 can be moved up onto their position on the sliding module 4 from their position lowered into the side wall 10 of the bed. The back row of seats or the bench seat 20 is made usable by folding down the seat surface 21 or the seat surfaces of the individual seats. The rear bench seat 20 can be removed from the sliding module 4 in the short position so that the driver's compartment 2 is pushed as far as directly against the backrests of the front seats 9 so that the bed 11 has the maximum length.

To ventilate the motor vehicle, in the long position of the sliding module 4, the side windows 17 can be completely or partially opened by lowering them into the body.

Figure 5:
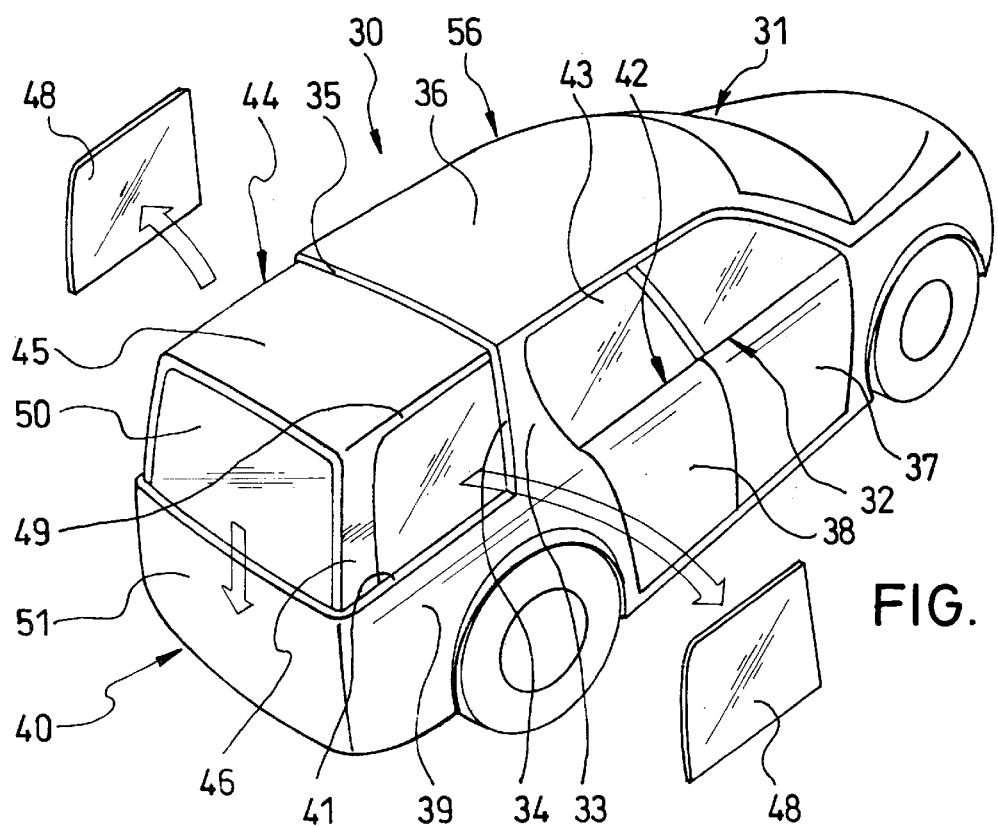
FIG. 5 is a perspective rear view of a second embodiment of a motor vehicle in accordance with the invention with a convertible passenger compartment.
Figure 6:
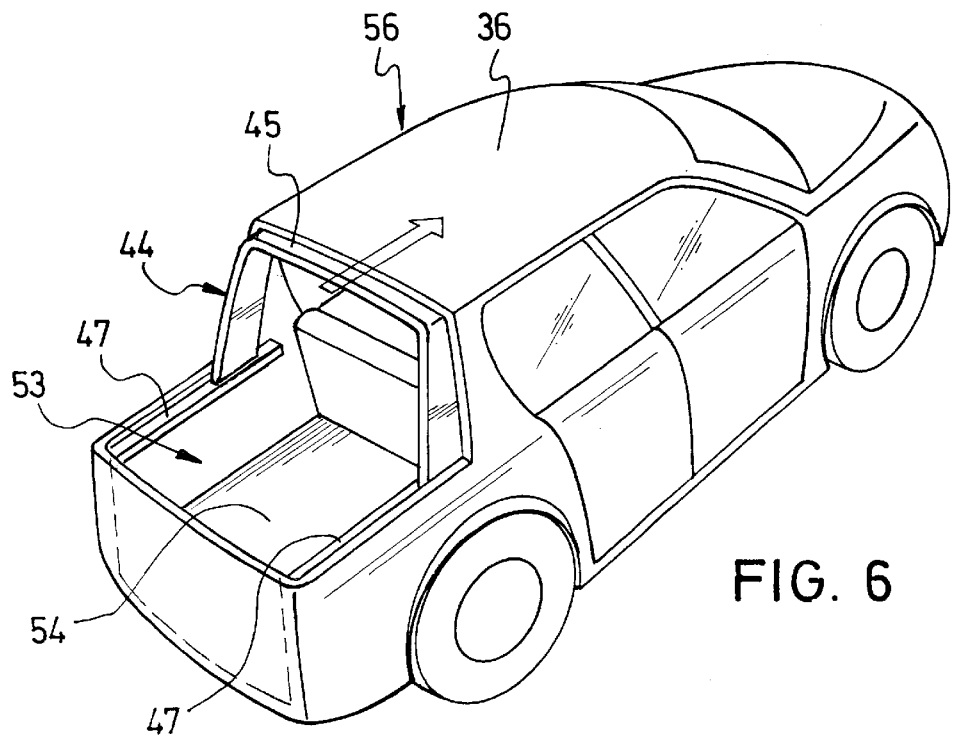
FIG. 6 is a perspective rear view of FIG. 5 motor vehicle in the short position of the passenger compartment.
Figure 7:
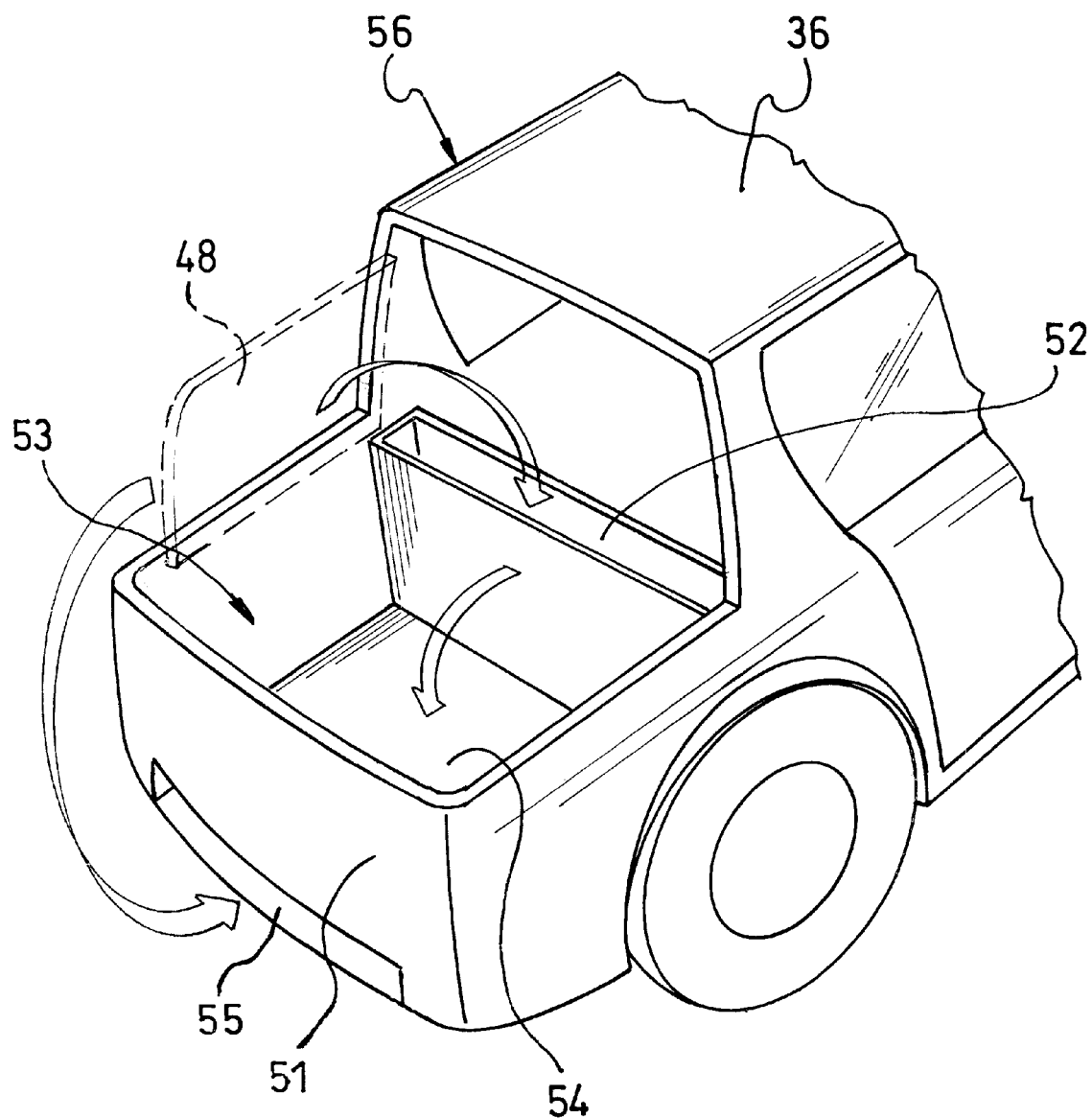
FIG. 7 is a rear perspective view a rear portion of the motor vehicle in the short position of the passenger compartment with arrangements for storage of removable windows.

A station wagon 30 is shown in FIGS. 5 to 7 as another embodiment of a motor vehicle with a convertible passenger compartment. Station wagon 30 contains a vehicle body with a passenger compartment 31 which is made conventionally, with a fixed section 56 which ends as part of the fixed body structure towards the rear 40 above the equator line 32 with the C-columns 33. The rear edge 34 of the C-columns 33 and the rear edge 35 of the motor vehicle roof 36 form a continuous rear termination of the fixed section 56 of the passenger compartment 31. The passenger compartment 31 contains, for example, two doors or, as shown, two front doors 37 and two rear doors 38.

The body structure contains a rear vehicle side wall 39 which extends from the C-column 33 rearward to the vehicle rear 40 and ends in the top edge 41 at the height of the equator line 32. The equator line 32 lies on an extension of the bottom edge 42 of the door side windows 43, and thus, also assumes a position which lies on the rear edge of the rear side window for a conventionally closed station wagon.

The motor vehicle contains a sliding module 44 which forms a rear movable section of the passenger compartment 31 in the manner of the rear body of a station wagon. The sliding module 44 contains a module roof 45 and rear supports 46 which, in the extended position of the sliding module 44 (see FIG. 5), correspond to the D-columns of a conventional station wagon. The module roof 45 is guided by a guide means, such as a guide sleeve, flanges or rollers (not shown), so that it can be pushed forward to under the motor vehicle roof 36. In doing so, for example, it can be pushed into a holding space which is formed between the motor vehicle roof 36 and the inside lining or headlining (see FIG. 6). Consequently, the module roof 45 has a slightly smaller width than the motor vehicle roof 36 and is matched in its shape to the motor vehicle roof 36.

The supports 46 of the sliding module 44 are movably supported on guide rails 47 which are aligned lengthwise (see FIG. 6) and which are located on the two side walls 39 of the motor vehicle, for example, in the area of the top edge 41 of the side walls 39. The sliding module 44 has a right and a left side window 48 which can be inserted onto the extended sliding module 44 and can be removed before pushing in the sliding module 44. The pushed-in side window 48 tightly adjoins the roof frame 49 and the support 46 as well as the top edge 41 of the side walls 39 and the C-column 33.

Furthermore, the sliding module 44 contains a rear window 50 which can be lowered out of its arrangement which rearwardly terminates the passenger compartment 31 (see FIG. 5) when the sliding module 44 is extended before the sliding module 44 is moved into the bottom rear wall 51 which can also be a rear door.

To hold the side windows 48 which have been removed from the sliding module 44, there is, for example, an essentially vertical storage compartment 52 (see FIG. 7) behind the rear seats (not shown) and in front of a cargo space or trunk 53. The storage compartment 52 is pivotally mounted, either on the cargo space bottom 54 or the side walls 39, to pivot around its lower edge. When not in use, the compartment 52 can be swung down onto the bottom 54 of the cargo space so as to lay flat thereon, thereby enabling use of the full length of the cargo space 53 with the rear seats folded down.

When the side windows 48 are removed from the sliding module 44, it can be pushed forward, the modular roof 45 being held under or in the fixed motor vehicle roof 36. Since the side windows 48 are removed, neither entering or leaving through the rear or the front side door is adversely affected by the sliding module 44 having been pushed forward, nor is the door side window covered 43.

alternatively, the module side windows 48 can be housed in a storage compartment 55 under the cargo space 53 which is accessible from the rear 40 (see FIG. 7).

What is claimed is:

1. A motor vehicle with a vehicle body having a convertible passenger compartment, comprising a passenger compartment formed of a fixed front section which has a fixed motor vehicle roof overlying the fixed front section and a movable rear sliding module having a rear roof section and which is supported on the vehicle body to move relative to the fixed front section, with the rear roof section being movable under the fixed motor vehicle roof, for varying the size of the passenger compartment between a short position upwardly exposing a rear portion of the vehicle body and a long position overlying and enclosing a rear portion of the motor vehicle body.

2. The motor vehicle as claimed in claim 1, wherein the sliding module is receivable in the fixed front section.

3. The motor vehicle as claimed in claim 1, wherein the sliding module has a side window on each side which is removable and re-mountable when the module is in said long position.

4. The motor vehicle as claimed in claim 3, wherein a side holding space is provided for each side window, said holding space being provided in or on a respective side wall of the motor vehicle; and wherein each side window is downwardly movable into the respective holding space when the sliding module is in said long position.

5. The motor vehicle as claimed in claim 4, wherein guides on which the side window is supported to move vertically are provided on the side holding space.

6. The motor vehicle as claimed in claim 3, wherein the side windows are manually removable and re-insertable from the sliding module.

7. The motor vehicle as claimed in claim 6, wherein at least one storage space is provided for the side windows.

8. The motor vehicle as claimed in claim 1, wherein a rear window is provided at a rear end of the sliding module.

9. The motor vehicle as claimed in claim 8, wherein the rear window is removable from the sliding module.

10. The motor vehicle as claimed in claim 9, wherein a storage space is provided for the rear window after removal thereof from the sliding module.

11. The motor vehicle as claimed in claim 10, wherein the storage space is a holding compartment which is located behind a rear vehicle seat.

12. The motor vehicle as claimed in claim 11, wherein the holding compartment is arranged essentially vertically and is displaceable onto a bottom of a cargo space or trunk.

13. The motor vehicle as claimed in claim 1, wherein the sliding module has two rear supports in the form of one of C-Columns and D-Columns.

14. The motor vehicle as claimed in claim 13, wherein the sliding module is movably supported on longitudinally extending lateral guides via the supports.

15. The motor vehicle as claimed in claim 13, wherein the sliding module is movably supported on longitudinally extending guides on one of a side wall of a cargo space or trunk.

16. The motor vehicle as claimed in claim 1, wherein the sliding module is movably supported, in an area of the roof thereof, by the motor vehicle roof of the fixed front section.

17. The motor vehicle as claimed in claim 1, wherein the sliding module contains a seating means which is movable with the sliding module.

18. The motor vehicle as claimed in claim 17, wherein the seating means has a seat surface which is mounted to be folded up.

19. The motor vehicle as claimed in claim 16, wherein the seating means is removable from the sliding module.

20. The motor vehicle as claimed in claim 1, wherein the fixed front section of the passenger compartment has at least one row of seats.

21. The motor vehicle as claimed in claim 1, wherein the sliding module forms a rear motor vehicle body in the manner of a station wagon in said long position.

22. The motor vehicle as claimed in claim 1, wherein the motor vehicle is a pick-up truck with an open rear bed, and wherein the sliding module in said long position is located over a front section of the bed.

23. The motor vehicle as claimed in claim 22, wherein the sliding module has a side window on each side which is removable and re-mountable when the module is in said long position; wherein each the side windows is manually removable and re-insertable from the sliding module; and wherein at least one storage space is provided for the side windows, said storage space being provided in said bed.

* * * * *